US012519121B2

United States Patent
Selverston et al.

(10) Patent No.: US 12,519,121 B2
(45) Date of Patent: Jan. 6, 2026

(54) SEALED AQUEOUS FLOW BATTERY SYSTEMS WITH IN-TANK ELECTROLYTE REBALANCING

(71) Applicant: CASE WESTERN RESERVE UNIVERSITY, Cleveland, OH (US)

(72) Inventors: Steven Selverston, Cleveland Heights, OH (US); Jesse S. Wainright, Willoughby Hills, OH (US); Robert Savinell, Solon, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 345 days.

(21) Appl. No.: 17/363,269

(22) Filed: Jun. 30, 2021

(65) Prior Publication Data

US 2021/0344030 A1     Nov. 4, 2021

Related U.S. Application Data

(63) Continuation of application No. 15/766,121, filed as application No. PCT/US2016/056230 on Oct. 10, 2016, now abandoned.

(Continued)

(51) Int. Cl.
*H01M 8/18*     (2006.01)
*H01M 4/36*     (2006.01)
(Continued)

(52) U.S. Cl.
CPC ............ *H01M 8/188* (2013.01); *H01M 4/36* (2013.01); *H01M 8/0662* (2013.01); *H01M 8/20* (2013.01); *Y02E 60/50* (2013.01)

(58) Field of Classification Search
CPC ............ H01M 8/18; H01M 8/200662; H01M 8/0693; H01M 8/04089; H01M 8/04276;
(Continued)

(56) References Cited

U.S. PATENT DOCUMENTS 4,159,366 A    6/1979  Thaller
4,576,878 A    3/1986  Gahn
(Continued)

FOREIGN PATENT DOCUMENTS

CN    103339775       2/2017
JP    2013037856 A    2/2013
(Continued)

OTHER PUBLICATIONS

European Patent Office, Extended European Search Report, EP 16854529, mailed Mar. 22, 2019.
(Continued)

*Primary Examiner* — Stephen J Yanchuk
(74) *Attorney, Agent, or Firm* — McDonald Hopkins LLC

(57) ABSTRACT

A battery system comprising a sealed aqueous flow battery that employs a passive, in-tank electrolyte recombination system. The recombination system allows for electrolyte stabilization in batteries where hydrogen evolution may occur as a side reaction without the need to use any externally-supplied rebalancing reactants. The system is a passive system that does not require a control system, additional pumps, or pumping energy.

16 Claims, 9 Drawing Sheets

Related U.S. Application Data

(60) Provisional application No. 62/239,469, filed on Oct. 9, 2015.

(51) Int. Cl.
*H01M 8/0662* (2016.01)
*H01M 8/20* (2006.01)

(58) Field of Classification Search
CPC . H01M 2300/0002; H01M 8/188; H01M 8/20
See application file for complete search history.

(56) References Cited

U.S. PATENT DOCUMENTS

| | | | |
|---|---|---|---|
| 7,572,546 | B2 | 8/2009 | Karamanev |
| 7,820,321 | B2 | 10/2010 | Horne et al. |
| 7,909,982 | B2 | 3/2011 | Glass et al. |
| 8,916,281 | B2 | 12/2014 | Chang et al. |
| 8,980,454 | B2 | 3/2015 | Pham et al. |
| 9,225,031 | B2 | 12/2015 | Whitehead et al. |
| 9,363,491 | B2 | 6/2016 | Kawai et al. |
| 9,509,011 | B2 | 11/2016 | Evans et al. |
| 10,230,125 | B2 | 3/2019 | Evans et al. |
| 10,249,897 | B2 | 4/2019 | Reece et al. |
| 2014/0272483 | A1* | 9/2014 | Pham ................ H01M 8/04186 429/51 |
| 2015/0255824 | A1* | 9/2015 | Evans ................ H01M 8/188 429/418 |
| 2016/0248109 | A1 | 8/2016 | Esswein et al. |

FOREIGN PATENT DOCUMENTS

| | | |
|---|---|---|
| JP | 2014-137946 | 7/2014 |
| JP | 5802858 | 2/2015 |
| JP | 600661 | 10/2016 |
| WO | 2015048074 | 4/2015 |
| WO | 2015095555 | 6/2015 |

OTHER PUBLICATIONS

Patent Cooperation Treaty (PCT), International Search Report and the Written Opinion for Application PCT/US2016/056230 filed on Oct. 10, 2016, mailed Dec. 19, 2016, International Searching Authority, US.

L. W. Hruska and R. F. Savinell, "Investigation of Factors Affecting Performance of the Iron-Redox Battery," Journal of the Electrochemical Society, vol. 423, No. 1976, pp. 18-25, 1981.

L. H. Thaller, "Redox Flow Cell Energy Storage Systems," tech. rep., NASA, 1979.

S. Corcuera and M. Skyllas-Kazacos, "State-of-Charge Monitoring and Electrolyte Rebalancing Methods for the Vanadium Redox Flow Battery," European Chemical Bulletin, vol. 1, No. 1, pp. 511-519, 2012.

J. S. Symanski, "Defining a Recombination Efficiency for Sealed, Lead-Acid Batteries," Journal of The Electrochemical Society, vol. 135, p. 548, 1988.

M. Maja and N. Penazzi, "Sealed Gas Recombining Lead-Acid Batteries Part I: a Simple Theoretical Approach," Journal of Power Sources, vol. 25, pp. 99-109, 1989.

\* cited by examiner

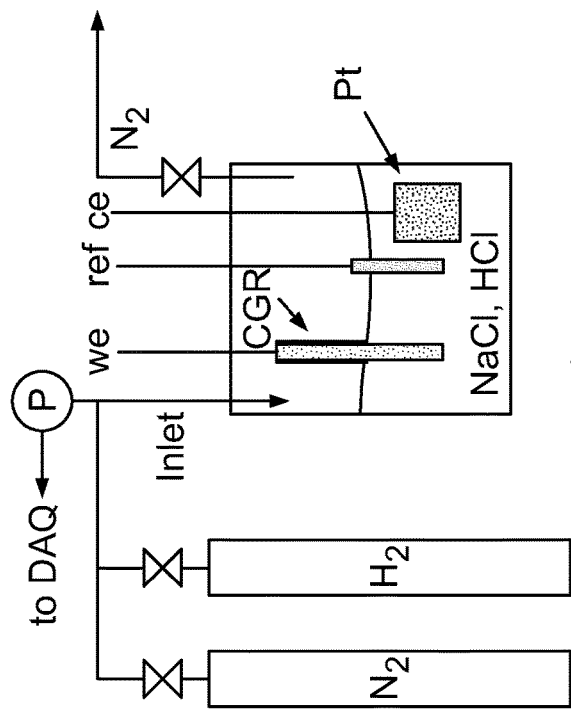
FIG. 6
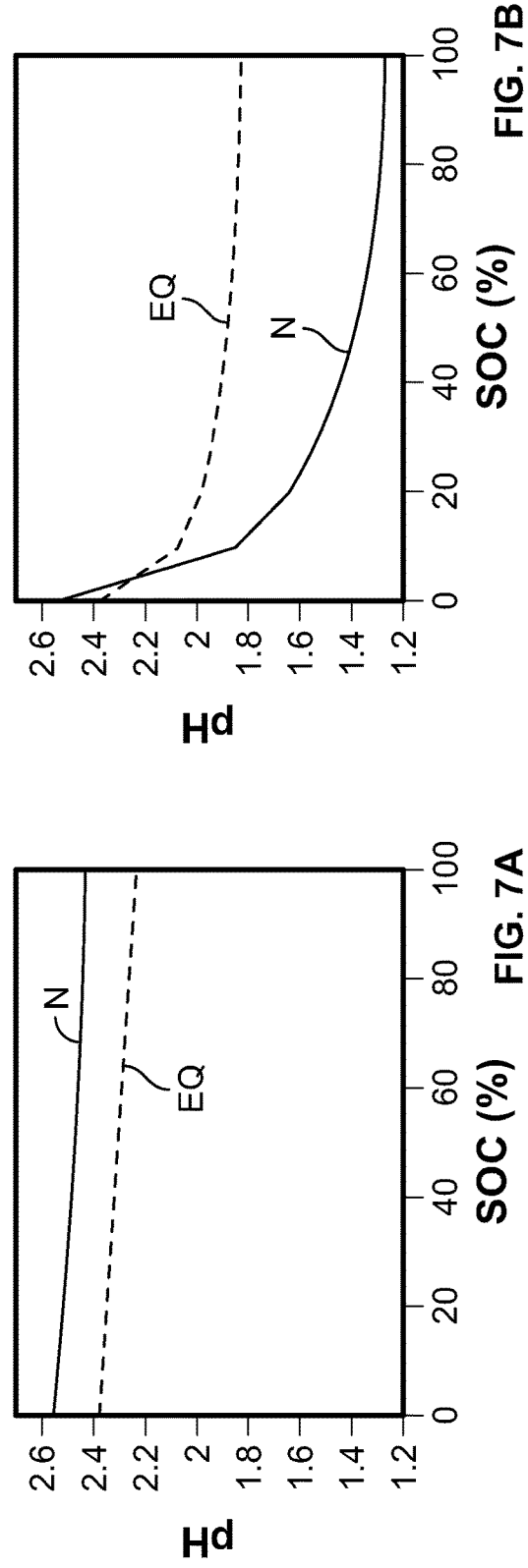
FIG. 7A
FIG. 7B

SEALED AQUEOUS FLOW BATTERY SYSTEMS WITH IN-TANK ELECTROLYTE REBALANCING

This application is a continuation of co-pending U.S. patent application Ser. No. 15/766,121 filed on Apr. 5, 2018, which is a 35 U.S.C. 371 national stage filing of PCT Application No. PCT/US2016/056230 filed on Oct. 10, 2016 which claims priority to U.S. Provisional Patent Application Ser. No. 62/239,469 filed on Oct. 9, 2015, each of which are incorporated herein in their entirety by reference.

RELATED APPLICATIONS AND GOVERNMENT RIGHTS

This invention was made with government support under Contract Number DE-AC04-94AL85000 awarded by the U.S. Department of Energy. The government has certain rights in the invention.

FIELD OF THE INVENTION

This invention relates to a battery system comprising a sealed aqueous flow battery that employs a passive, in-tank electrolyte recombination system. The recombination system allows for electrolyte stabilization in batteries where hydrogen evolution may occur as a side reaction without the need to use any externally-supplied rebalancing reactants. The system is a passive system that does not require a control system, additional pumps, or pumping energy.

BACKGROUND OF THE INVENTION

Flow batteries store electrical energy in a chemical form and subsequently dispense the stored energy in an electrical form via a spontaneous reverse redox reaction. A reduction-oxidation (redox) battery is an electrochemical storage device in which an electrolyte containing one or more dissolved electro-active species flows through a reactor cell where chemical energy is converted to electrical energy. Conversely, the discharged electrolyte can be flowed through a reactor cell such that electrical energy is converted to chemical energy. The electrolytes used in flow batteries are generally composed of ionized metal salts that are stored in large external tanks and are pumped through each side of the cell according to the charge/discharge current applied. Externally-stored electrolytes can be flowed through the battery system by pumping, gravity feed, or by any other method of moving fluid through the system. The reaction in a flow battery is reversible, and the electrolyte can be recharged without replacing the electroactive material. The energy capacity of a redox flow battery, therefore, is related to the total electrolyte volume, e.g., the size of the storage tank. The discharge time of a redox flow battery at full power also depends on electrolyte volume and often varies from several minutes to many days. The minimal unit that performs the electrochemical energy conversion is generally called a "cell," whether in the case of flow batteries, fuel cells, or secondary batteries. A device that integrates many such cells, coupled electrically in series or parallel, to get higher current or voltage or both, is generally called a "battery." As used herein, the term "battery" may refer to a single electrochemical cell or a plurality of electrically coupled cells. Like traditional batteries, cells may be "stacked" together in a flow battery system to achieve the desired power output. Thus, the terms "cell" and "battery" can be used interchangeably herein.

Since the electrolyte is stored externally, the amount of energy that can be stored by a flow battery is largely determined by the solubility of the chemicals and the size of the tanks. The size of the tanks and storage capacity can be easily scaled. A true flow battery has all chemical species flowing through the battery and stored in external tanks and thus the energy and volume capacities can be sized independently. The vanadium redox flow battery is an example of a true flow battery and has received the most attention in recent years. In a hybrid flow battery, at least one of the chemical states resides within the stack such as by plating out as a metal. One example of a hybrid flow battery is a zinc-bromine battery, where the zinc metal is plated out. In these systems, the power and energy capacities are coupled, and the plating density affects the energy/power capacity ratio.

Redox flow batteries can be utilized in many technologies that require the storage of electrical energy. For example, redox flow batteries can be utilized for storage of night-time electricity (which is inexpensive to produce) to subsequently provide electricity during peak demand when electricity is more expensive to produce or demand is beyond the capability of current production. Such batteries can also be utilized for storage of green energy, i.e., energy generated from renewable sources such as wind, solar, wave, or other non-conventional sources.

Many devices that operate on electricity are adversely affected by the sudden removal of their power supply. Flow redox batteries can be utilized as uninterruptible power supplies in place of more expensive backup generators. Efficient methods of power storage can be used to construct devices having a built-in backup that mitigates the effects of power cuts or sudden power failures. Power storage devices can also reduce the impact of a failure at a generating station.

Other situations where uninterruptible power supplies can be of importance include, but are not limited to, buildings where uninterrupted power is critical, such as hospitals. Such batteries can also be utilized for providing an uninterruptible power supply in developing countries, many of which do not have reliable electrical power sources, resulting in intermittent power availability. Another possible use for redox flow batteries is in electric vehicles. Electric vehicles can be rapidly "recharged" by replacing the electrolyte. The electrolyte can be recharged separately from the vehicle and reused.

There is a significant need for reliable, low-cost energy storage. For example, large scale energy storage is needed for wind and solar power plants to provide continuous output power. Aqueous flow battery technologies have received renewed interest due to many advantages over other forms of energy storage. One of the main difficulties in developing aqueous flow battery systems is the electrolyte imbalance that results from undesired hydrogen generation, which can happen at the negative electrode according to Equation 1 below. Particularly in all-iron hybrid flow batteries, the hydrogen generation and associated electrolyte imbalance (e.g., potentially reflect in a pH change) are critical issues to solve. See L. W. Hruska and R. F. Savinell, "Investigation of Factors Affecting Performance of the Iron-Redox Battery," *Journal of the Electrochemical Society*, vol. 423, no. 1976, p. 18, 1981 The all-iron flow battery, which has significant cost and safety advantages over the currently-leading systems (e.g., all-vanadium, iron-chromium, zinc-bromine), operates according to the overall reaction shown in Equation 2.

$$2H^+ + 2e \rightarrow H_2 \quad E^0 = 0.0V \tag{1}$$

$$3Fe^{2+} \leftrightarrows Fe^0 + 2Fe^{3+} \quad E^0 = 1.18 \text{ V} \tag{2}$$

When hydrogen generation causes the pH to rise too high (i.e., when too many protons are removed from solution), the battery reactants ($Fe^{2+}$ and $Fe^{3+}$) can react to form iron hydroxides, which precipitate out of solution. Such phenomena leads to performance degradation and must be avoided in order to achieve long device lifetimes. The critical pH value is about pH=2.0, above which the $Fe^{3+}$ reacts to form a hydroxide given approximately by the formula $Fe(OH)_3$. Those reactions are shown by Equations 3 and 4. The hydroxide species precipitate out of solution, forming solid particles that can poison the membrane and electrodes by clogging surfaces and pores.

For long-term battery operation, electrolyte rebalancing methods must be used in order to bring the hydrogen (i.e., the protons) back into solution to keep the pH under control. In addition to maintaining acceptable proton balance, rebalancing is also required in order to balance the concentration of ferric ions (Fe3+). Without such rebalancing, excess ferric ions are produced, usually in proportion to the amount of protons lost as hydrogen. Because of the dual nature of this imbalance caused by hydrogen (i.e., the simultaneous loss of protons and gain of ferric ions), bulk pH control by adding an acid such as hydrochloric acid (HCl) is not a complete or effective strategy because it does not reduce the ferric ions. Therefore, a comprehensive and more preferred approach is to completely rebalance including by way of reaction (5) below:

$$Fe^{2+}+2OH^-\rightarrow Fe(OH)_2 \quad (3)$$

$$Fe^{3+}+3OH^-\rightarrow Fe(OH)_3 \quad (4)$$

$$2Fe^{3+}+H_2\rightarrow Fe^{2+}+2H^+ \quad (5)$$

Several methods for electrolyte rebalancing have been described in the literature, but they all add considerable cost and complexity and most systems involve the introduction of chemicals into the system from external supplies. These reactants need to be pumped (for liquids) or controlled with pressure regulators (for gases), requiring extensive additional hardware and control systems. Such configurations are not well-suited for devices meant to last a long time with minimal maintenance and low cost.

BRIEF SUMMARY OF THE INVENTION

The present technology provides a battery system comprising a reactor designed for passive, in-tank electrolyte recombination and a passive, diffusion-based recombination process designed for sealed flow battery systems.

In one aspect, the invention comprises a sealed aqueous battery system for rebalancing electrolyte in the system. The flow battery system comprises an electrolyte system that generates hydrogen as part of a charge/discharge reaction, and a reactor disposed in a positive electrolyte reservoir. The reactor is configured to convert hydrogen generated by the battery system to protons.

In one embodiment, the sealed aqueous flow battery system comprises a reactor designed for in-tank electrolyte recombination. In one embodiment, the reactor comprises an electrode for reacting with the hydrogen. In one embodiment, the reactor is partially submerged in a positive electrolyte reservoir. In one embodiment, the reactor comprises a membrane-electrode assembly that is partially submerged in the positive electrolyte reservoir. In another embodiment, the reactor comprises an array of membrane-electrode assemblies. In yet another embodiment, the reactor comprises a capillary action galvanic reactor (CGR). In another embodiment, the reactor comprises an array of CGRs.

In another aspect of the invention, a passive $H_2$—$Fe^{3+}$ recombination method is employed for electrolyte stabilization in aqueous flow batteries.

In one embodiment, the method of recombining electrolytes in a sealed aqueous flow battery system comprises providing a reactor designed for in-tank electrolyte recombination, wherein the reactor is partially submerged in a positive electrolyte reservoir.

In one embodiment, or any of the embodiments or methods described herein, the reactor further comprises a partially submerged porous electrode. In one embodiment, the partially porous electrode is catalyzed on one end. The catalyst may be any suitable catalyst that is active for the hydrogen reduction reaction that provided that the catalyst is stable in the electrolyte of interest. In one embodiment, the catalyst may be selected from platinum (Pt), palladium (Pd), iridium (Ir), and ruthenium (Ru). In one embodiment, the electrode does not include a membrane, but includes a porous material capable of being wetted by the liquid electrolyte to provide a conduction path.

In one embodiment, or any of the embodiments or methods described herein, no pumps or externally-supplied gasses are used for the purpose of recombining electrolytes in the aqueous flow battery system.

In one embodiment, or any of the embodiments or methods described herein, the battery system further comprises an in-line proton diffusion cell in order to allow protons to transport from the positive to the negative electrolyte In one embodiment, or any of the embodiments or methods described herein, the aqueous flow battery system comprises a battery selected from an iron flow battery, an iron-chromium battery, a zinc-bromine battery, and any other flow battery that generate undesired hydrogen. In one embodiment, the aqueous flow battery comprises an iron flow battery.

In one embodiment, or any of the embodiments or methods described herein, the battery system may comprise a negative head space above a negative electrolyte reservoir and a positive head space above the positive electrolyte reservoir, wherein a connector connects the negative head space and the positive headspace.

In one embodiment, or any of the embodiments or methods described herein, the sealed aqueous flow battery further comprises an air mover. The air mover may comprise any device that is known to facilitate the movement of air/gasses such as, but not limited to, a fan, a blower, a compressor, etc. The air mover draws the hydrogen/nitrogen mixture out of the negative head space, moves the gas through the positive head space where the hydrogen will be consumed, and then returns the nitrogen to the negative tank.

In one embodiment, the positive electrolyte return is integrated with the recombination electrodes in order to provide convective mass transport of $Fe^{3+}$ without incurring any additional pumping losses In one embodiment, or any of the embodiments or methods described herein, the sealed aqueous flow battery system comprises (1) a first half-cell comprising a positive electrolyte and an electrode disposed within the first half-cell; (2) a second half-cell comprising a negative electrolyte and an electrode disposed within the second half-cell; (3) a separator between the first and second half-cells; (4) a first storage tank external to the first half-cell for circulating the positive electrolyte to and from the first half-cell; (5) a second storage tank external to the second half-cell for circulating the negative electrolyte to and from the second half-cell; and (6) a reactor disposed in the first storage tank, wherein the reactor is configured to convert hydrogen generated by the battery system to protons.

Therefore, a sealed aqueous flow battery system for rebalancing electrolyte within the system is contemplated. Certain embodiments of that system may include any combination of the following:

an electrolyte system that generates hydrogen as part of a charge/discharge reaction;
a reactor disposed in a positive electrolyte reservoir, the reactor configured for converting hydrogen generated by the battery to protons;
an in-line proton diffusion cell for transporting the protons;
an air mover;
a negative head space above a negative electrolyte reservoir and a positive head space above the positive electrolyte reservoir;
wherein the reactor comprises an electrode for reacting with the hydrogen;
wherein the reactor comprises a membrane or porous material to allow for transport of the protons into the positive electrolyte reservoir;
wherein the reactor is partially submerged in the positive electrolyte reservoir;
wherein the reactor comprises a plurality of reactors;
wherein the reactor further comprises a partially submerged porous electrode;
wherein the partially porous electrode is catalyzed by a catalyst selected from platinum, palladium, iridium, and ruthenium;
characterized by an absence of pumps and pressurized gasses for the purpose of recombining electrolytes;
wherein the aqueous flow battery is selected from an iron flow battery, an iron-chromium battery, a zinc-bromine battery, and a flow battery that generates undesired hydrogen;
and
wherein a connector connects the negative head space and the positive headspace.

A method of balancing electrolytes in a sealed aqueous flow battery system is also contemplated. Certain embodiments of that method may include any combination of the following:

providing a reactor designed for in-tank electrolyte recombination, wherein the reactor is partially submerged in a positive electrolyte reservoir;
maintaining a functional pH within the system through the use of an in-line proton diffusion cell;
providing a supply of hydrogen to the reactor from a negative head space above a negative electrolyte reservoir to a positive head space above the positive electrolyte reservoir;
wherein the hydrogen is supplied through the use of an air mover;
wherein the reactor further comprises a membrane-electrode assembly that is partially submerged in the positive electrolyte reservoir;
wherein the reactor comprises an array of membrane-electrode assemblies;
wherein the reactor further comprises a partially submerged porous electrode;
wherein the partially porous electrode is catalyzed on one end;
wherein the partially porous electrode is catalyzed by a catalyst selected from platinum, palladium, iridium, and ruthenium;
wherein the electrode does not include any membranes;
wherein no pumps or pressurized gasses are used for the purpose of recombining electrolytes; and
wherein the aqueous flow battery is selected from an iron flow battery, an iron-chromium battery, a zinc-bromine battery, and any other flow battery that generate undesired hydrogen.

A sealed aqueous flow battery system as disclosed herein may also incorporate any combination of the following:

a first half-cell comprising a positive electrolyte and an electrode disposed within the first half-cell;
a second half-cell comprising a negative electrolyte and an electrode disposed within the second half-cell;
a separator between the first and second half-cells;
a first storage tank external to the first half-cell for circulating the positive electrolyte to and from the first half-cell; and
a second storage tank external to the second half-cell for circulating the negative electrolyte to and from the second half-cell;
a reactor disposed in the first storage tank, wherein the reactor is configured to convert hydrogen generated by the battery system to protons;
an in-line proton diffusion cell for transporting the protons;
a negative head space above a negative electrolyte reservoir and a positive head space above the positive electrolyte reservoir, wherein a connector connects the negative head space and the positive headspace;
an air mover;
wherein the reactor comprises an electrode for reacting with the hydrogen;
wherein the reactor comprises a membrane or porous material to allow for transport of the protons into the positive electrolyte reservoir;
wherein the reactor is partially submerged in the positive electrolyte reservoir;
wherein the reactor comprises a plurality of reactors;
wherein the reactor further comprises a partially submerged porous electrode;
wherein the partially porous electrode is catalyzed by a catalyst selected from platinum, palladium, iridium, and ruthenium;
wherein no pumps or pressurized gasses are used for the purpose of recombining electrolytes; and
wherein the aqueous flow battery is selected from an iron flow battery, an iron-chromium battery, a zinc-bromine battery, and any other flow battery that generate undesired hydrogen.

A separate method for rebalancing electrolyte within a sealed flow battery system is also contemplated. The system includes a negative electrolyte reservoir, a positive electrolyte reservoir including an oxidation reactor, and a charge/discharge reaction cell, and the method may encompass any combination of the following steps:

providing negative electrolyte and positive electrolyte to the reaction cell to drive a charge/discharge reaction;
transporting hydrogen gas evolved from the charge/discharge reaction to the positive electrolyte reservoir;
converting at least a portion of the hydrogen gas into protons in the oxidation reactor;
acidifying the positive electrolyte proximate to oxidation reactor with the protons supplied by the oxidation reactor;
returning the acidified positive electrolyte to the reaction cell;

supplying the acidified positive electrolyte to a diffusion cell before returning the acidified positive electrolyte to the reaction cell; and providing a head space within the negative and positive electrolyte reservoirs and wherein the hydrogen gas is transported through both the negative and positive electrolyte head spaces before the hydrogen gas is converted to protons.

Finally, a sealed aqueous flow battery system as contemplated herein may separately include any combination of the following elements:

an electrolyte system including a negative electrolyte reservoir containing a negative electrolyte and a positive electrolyte reservoir containing a positive electrolyte;

a charge/discharge reaction cell having a separator disposed within a reaction chamber and independent fluid connections on opposing sides of the separator to receive negative electrolyte from the negative electrolyte reservoir and positive electrolyte from the reservoirs;

an oxidation reactor positioned at least partially in contact with fluids contained in the positive electrolyte reservoir, wherein the oxidation reactor receives hydrogen gas generated by the charge/discharge reaction of the battery system and supplies protons to the battery system;

wherein a plurality of reactors are included;

wherein the reactor is one of a capillary-action galvanic reactor and a membrane electrode assembly;

wherein the reactor is includes a plurality of membrane electrode assemblies;

wherein the reactor is in fluidic contact with: a) hydrogen gas provided to a head space of the positive electrolyte reservoir and b) the positive electrolyte;

wherein the reactor comprises a porous material;

wherein the reactor is at least one of: free floating on the positive electrolyte and partially submerged in the positive electrolyte;

wherein the reactor comprises a hydrogen electrode and an iron electrode;

wherein catalyst is carried on a single end of the porous electrode;

wherein the reactor comprises a catalyst including at least one of platinum, palladium, iridium, and ruthenium;

wherein the reactor comprises a carbon material exposed to a solution phase reaction of metal ions in the positive electrolyte;

wherein a head space of the positive electrolyte reservoir is connected via a hydrogen gas conduit to receive hydrogen gas provided from a head space over the negative electrolyte reservoir;

wherein the hydrogen gas conduit includes an air mover;

wherein the electrolyte system also includes at least one electrolyte pump associated with the fluid connection between the reaction cell and at least one of the negative electrolyte reservoir and the positive electrolyte reservoir;

an in-line proton diffusion cell;

wherein the reaction cell includes at least one of a graphite plate and a carbon felt material;

wherein the battery system is selected from a vanadium flow battery, an iron flow battery, an iron-chromium battery, and a zinc-bromine battery;

wherein the protons react with the positive electrolyte in the positive electrolyte reservoir to produce ferrous ions;

wherein the battery system is passive;

wherein the passive battery system is characterized by an absence of pumps and pressurized gases; and wherein the passive battery system is characterized by an absence of externally-supplied rebalancing reactants.

BRIEF DESCRIPTION OF THE DRAWINGS

Other objects and advantages of the present invention will become apparent from the following description of the preferred embodiment when read in conjunction with the accompanying drawings. Any printed information contained in the drawings, including the connectivity and relative relationship of each element and the names, chemical formulae, and other data/information associated with each of those elements, are reproduced as if fully described and written within this specification. In certain schematics, common symbols may be used to represent and further describe certain elements, such as valves, inlets, outlets, and the like. In certain graphs, the data depicted within the graphs are encompassed by this specification, including any equations which may define that data (e.g., the slope of a line, the shape of a curve, etc.).

FIG. 6 is a schematic representation of the three-electrode setup used to characterize the upper half (i.e., the hydrogen electrode portion) of the capillary-action galvanic reactor in 2M NaCl (pH=1.4) at several different partial pressures of hydrogen.

FIGS. 7A-7B is a graphic representation of simulated natural pH and equilibrium pH with ferrihydrite for 7A negative and 7B positive electrolytes.

DETAILED DESCRIPTION OF THE INVENTION

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

As used herein the term "sealed aqueous flow battery" refers to a system that is thermodynamically closed and pressurizable.

As used herein, the term "passive" as it relates to a recombination/rebalancing method or system means a method or system that does not require additional pumps, pumping energy, or control systems.

The terms "rebalancing" and "recombination" may be used interchangeably when describing the invention.

The present technology provides a battery system comprising a sealed aqueous flow battery that employs a passive, in-tank electrolyte recombination system. The recombination system allows for electrolyte stabilization in batteries where hydrogen evolution may occur as a side reaction. Use of the recombination system allows the electrolyte to be rebalanced without the need to externally supply materials or fresh electrolyte to rebalance the reactants.

The system may be completely sealed, pressurizable, and substantially maintenance-free. No external reactants or pumps are necessary for recombination or rebalancing electrolyte. This system design is simple and stable and represents a major step forward toward commercialization of flow battery systems.

Figure 1:
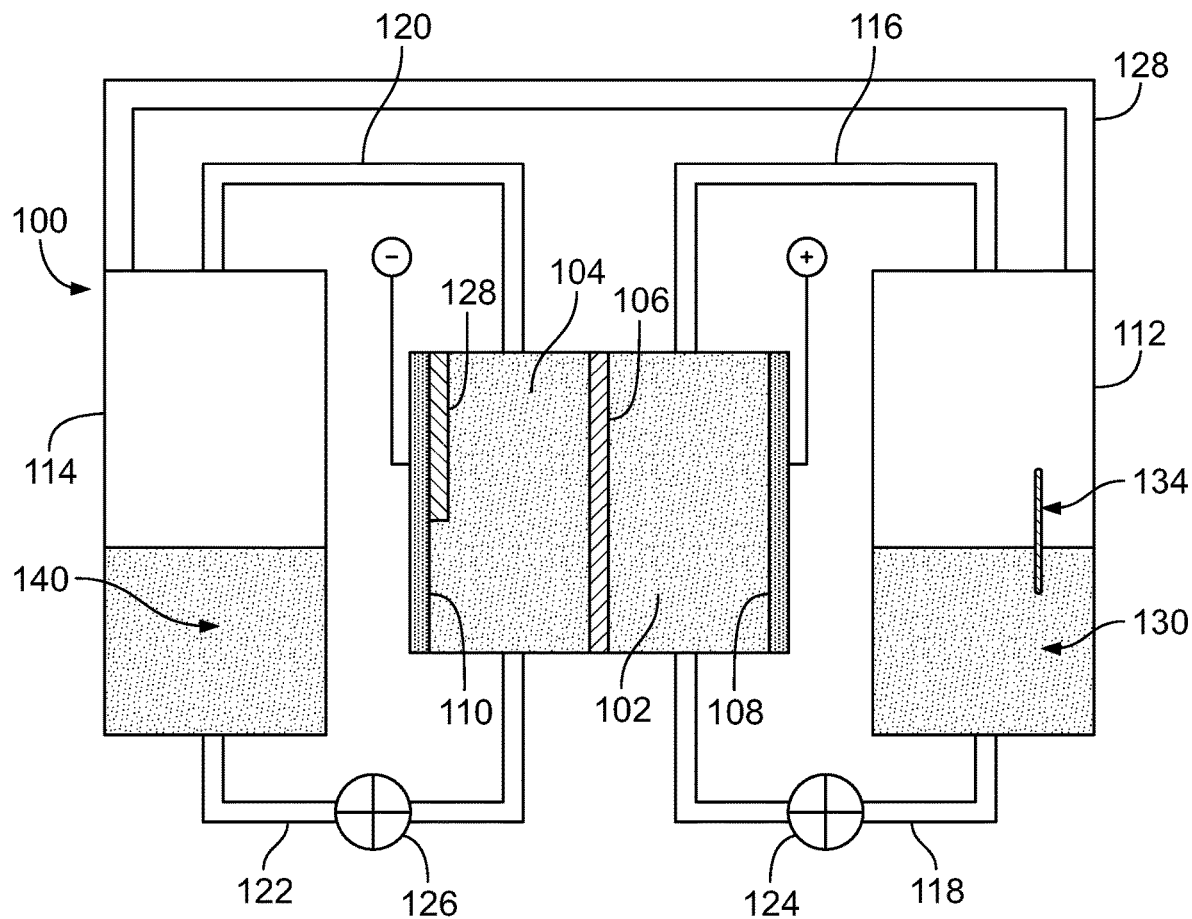
FIG. 1 is a schematic representation of a flow battery consistent with embodiments of the present technology.

FIG. 1 illustrates an embodiment of an aqueous flow cell system 100 suitable for use in connection with aspects of the present invention. Flow cell 100 includes two half-cells 102 and 104 separated by a separator 106. Half cells 102 and 104 include electrodes 108 and 110, respectively, in contact with an electrolyte such that an anodic reaction occurs at the surface of one of the electrodes and a cathodic reaction occurs at the other electrode. Electrolyte flows through each of the half-cells 102 and 104 as the oxidation and reduction reactions take place. In FIG. 1, the cathodic reaction takes place in half-cell 102 at electrode 108 (which is referred to herein as the positive electrode or the cathode), and the anodic reaction takes place in half-cell 104 at electrode 110 (which is referred to herein as the negative electrode or the anode).

The electrolyte in half-cells 102 and 104 flows through the system to storage tanks 112 and 114, respectively, and fresh/regenerated electrolyte flows from the tanks back into the half-cells. In FIG. 1, the electrolyte in half-cell 102 flows through pipe 116 to holding tank 112, and the positive electrolyte 130 in tank 112 flows to the half-cell 102 through pipe 118. Similarly, the electrolyte in half-cell 104 can flow through pipe 120 to holding tank 114, and negative electrolyte 140 from tank 114 flows through pipe 122 to half-cell 104.

The systems may be configured as desired to aid or control the flow of electrolyte through the system and may include, for example, any suitable pumps or valve systems. In the embodiment depicted in FIG. 1, the system includes pumps 124 and 126 to pump the electrolyte from tanks 112 and 114, respectively, to the half-cells. In some embodiments, the holding tank may segregate electrolyte that has flowed through the respective cells from electrolyte that has not. However, mixing discharged or partially discharged electrolyte may also be performed.

Electrodes 108 and 110 can be coupled to either supply electrical energy or receive electrical energy from a load or source. Other monitoring and control electronics, included in the load, can control the flow of electrolyte through half-cells 102 and 104. A plurality of cells 100 can be electrically coupled ("stacked") in series to achieve higher voltage or in parallel in order to achieve higher current.

The flow battery may comprise any electrolyte system suitable for use in a flow battery that produces hydrogen at the negative electrode. Examples of such systems include, but are not limited to, an all vanadium flow battery, an all iron flow battery, an iron-chromium flow battery, a zinc-bromine flow battery, etc. It will be appreciated that the compositions of the negative electrolyte and the positive electrolyte may be selected as desired by those skilled in the art for the particular flow battery of interest. In one embodiment, the battery system is an all-iron flow battery system. While aspects of a flow battery with a recombination system may be described herein with particular reference to an all-iron system, it will be appreciated that a flow battery in accordance with the present technology is not limited to such an electrolyte system.

Figure 2:
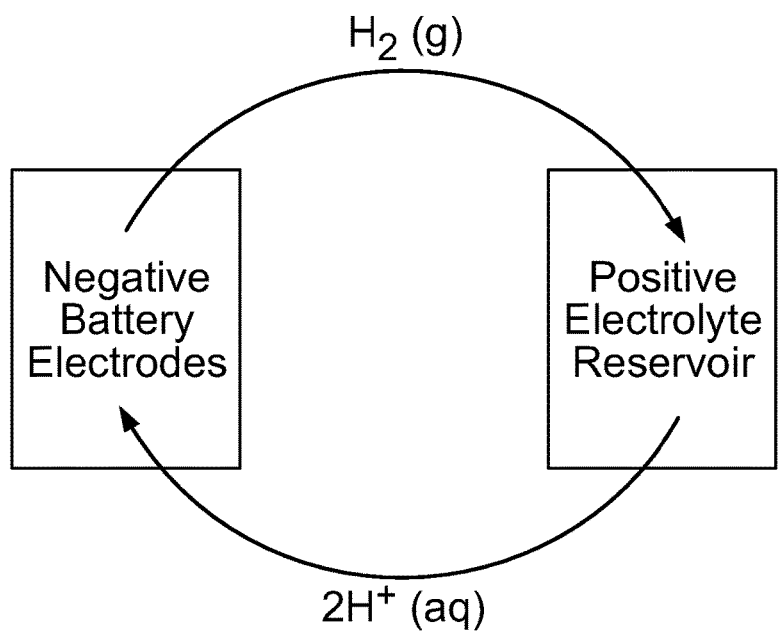
FIG. 2 depicts a diagram of an exemplary hydrogen cycle in a sealed aqueous flow battery system. Hydrogen gas is generated at the negative electrode, then diffuses to the positive reservoir, where it is converted back into protons.

In accordance with the present technology, the battery system is configured to control or rebalance the pH of the electrolytes, which may rise during operation of the battery due to hydrogen generation at the negative electrode during operation of the battery. The present technology accomplishes this via a reactor in the positive electrolyte storage tank that is configured to allow for oxidation of hydrogen to protons and reduction of metal species to a desired state in the electrolyte. FIG. 2 represents the general movement of hydrogen in the system. Hydrogen moves throughout the flow battery in a continuous cycle. Hydrogen generated in the negative half-cell is transported to the positive electrolyte reservoir where it is oxidized to provide protons and electrons. The protons and electrons can rebalance the electrolyte, and can be transported to the half-cells for further reaction.

Referring to FIG. 1, the system 100 includes a reactor 134 is partially submerged in the positive electrolyte 130 in tank 112. The reactor transports protons and/or electrons into the positive electrolyte 130. In particular, the reactor 134 is configured to allow hydrogen ($H_2$) in a head space of holding tank 112 to react and form protons ($H^+$) and electrons that move into the solution 130 and acidify the positive electrolyte.

Hydrogen generated in the negative half-cell is transported to holding tank 114 and a connector 128 allows for the hydrogen to be transported to the holding tank 112. In tank 112, the hydrogen can react with the reactor 134 to produce protons and electrons to rebalance the electrolytes which can be transported into the half-cells for further reactions.

The system may be configured to allow for the movement of hydrogen from the negative electrode to the positive electrolyte reservoir. In the embodiment depicted in FIG. 1, the system includes a head space connector 128 to connect holding tank 112 and holding tank 114. In one embodiment, air movers (not shown) may be used to facilitate the movement of air/gasses from holding tank 112 to holding tank 114.

In one embodiment, the system is a closed loop system in which hydrogen is transported from the negative holding tank 114 to the positive holding tank 112, via an air mover (e.g., a fan, blower, or compressor) that draws the hydrogen/nitrogen mixture out of the negative head space and moves the gas through the positive head space where the hydrogen will be consumed, and then returns the nitrogen to the negative tank 112.

In one embodiment of the invention, the head space is purged with nitrogen or another inert gas prior to operation of the battery to prevent oxygen from reacting with the iron electrolytes. The head space connection (e.g., connector 128) is an important design consideration since the hydrogen diffusion between tanks should be as fast as possible to keep up with the rate of hydrogen generation. Without being bound by a particular theory, it is believed that hydrogen is produced at the negative electrode and carried by the flowing electrolyte into the negative tank (e.g., tank 112) head space during battery charging. The hydrogen then diffuses through a head space connection (e.g., connector 128) to the positive tank (e.g., tank 114), where it can react.

The reactor, e.g., reactor 134, in the positive electrolyte storage tank 114 is configured to allow for reaction of the hydrogen in the tank to be reacted to form protons and electrons that move into the positive electrolyte. The reactor 134 is also configured to allow for conversion of the metal ions to the desired form for the electrolyte. Thus, the reactor for the system comprises an electrode material on at least a portion thereof for the reaction of the hydrogen, and also an electrode material on a portion thereof for the reaction (e.g., the reduction) of the metal ions to a desired state (e.g., from $Fe^{3+}$ to $Fe^{2+}$ in an iron flow battery). Generally, the reactor should be configured to be wetted with electrolyte material in the positive electrolyte storage tank.

In one embodiment, the reactor (e.g., reactor 134) is partially submerged in the electrolyte 130. The partially submerged reactor carries out the reaction of gaseous hydrogen with aqueous metal ions for recombination purposes. The portion of the reactor submerged in the positive electrolyte should be an electron conductor, but it does not have to be configured for a catalytic reaction provided that solution phase reaction of the metal occurs readily on carbon materials.

In an embodiment of the invention, the reactor comprises at least one membrane-electrode assembly (MEA) that is partially submerged in the positive electrolyte reservoir (e.g., in holding tank 112 of FIG. 1). Reactant transport may be passive, meaning no pumps or pressurized gasses are required. Furthermore, the system is completely closed and self-sufficient, unlike other systems that need a continuous supply of rebalancing reactants (e.g., hydrogen gas tanks or other rebalancing chemicals).

In one embodiment, the membrane of the MEA primarily serves to transport protons down into the liquid electrolyte. The reactor may be formed from any suitable material to allow for the desired reactions. In embodiments, the reactor may comprise an ionomer membrane such as Nafion, or a porous material that wicks up the liquid electrolyte such as the battery separator materials made by Celgard or Daramic, or even by a porous, electrically conductive material such as a carbon cloth or felt. In an embodiment in which the membrane is a porous, electrically conductive material, the material may also serve to transport both protons and electrons from the gas space down into the electrolyte. The portion of the reactor for the reaction of the hydrogen may be any suitable electrode material for such reactions. In embodiments, the electrode comprises a platinum (e.g., a Pt/C) electrode.

Once in the positive reservoir head space (i.e., the portion of the holding tank 114 not filled with liquid electrolyte 130), the hydrogen needs to find a reaction site on the MEA. In one embodiment, the MEA positioning is perpendicular to the solution so that part of it is kept dry.

At the upper, dry portion of each MEA, hydrogen reacts to form protons and electrons that move in the in-plane direction (downward) to the solution, acidifying the positive electrolyte. In one embodiment, an electron conductor is provided on the lower, submerged portion of the MEA. An optional catalyst may be present. Conventional fuel cells have oxidation at one electrode and reduction at the other catalyst layer, with proton transport in the through-plane direction. In one embodiment, the reactions may occur on both catalyst layers of each MEA, which is an important difference between this reactor and conventional rebalancing cells.

The reactor may include a partially submerged porous electrode. In this embodiment, the partially porous electrode is catalyzed on one end. The catalyst may be any suitable catalyst that is active for the hydrogen reduction reaction that provided that the catalyst is stable in the electrolyte of interest. In one embodiment, the catalyst may be selected from platinum (Pt), palladium (Pd), iridium (Ir), and ruthenium (Ru). In one embodiment, the electrode does not include a membrane, but includes a porous material capable of being wetted by the liquid electrolyte to provide a conduction path.

In another embodiment, the reactor is a partially submerged porous electrode that is catalyzed on one end but without any membranes. For example, in one embodiment, the reactor is a capillary-action reactor. In another embodiment, the reactor is a capillary-action galvanic reactor (CGR). These capillary-action based reactors rely on drawing liquid into the reactor via capillary motion and, as such, may include porous felt or other materials that promote wicking/capillary-action. As such, electrolyte communication occurs through capillary action in the porous felt of the CGR.

In one embodiment, the CGR operates as a shorted galvanic cell that oxidizes hydrogen and reduces ferric ions, releasing chemical energy as heat. In this embodiment, the reactor is fabricated as a single unit, but effectively contains two separate electrodes (a hydrogen electrode and an iron electrode), wherein the electrolyte communication occurs through capillary action in the porous felt.

Figure 13:
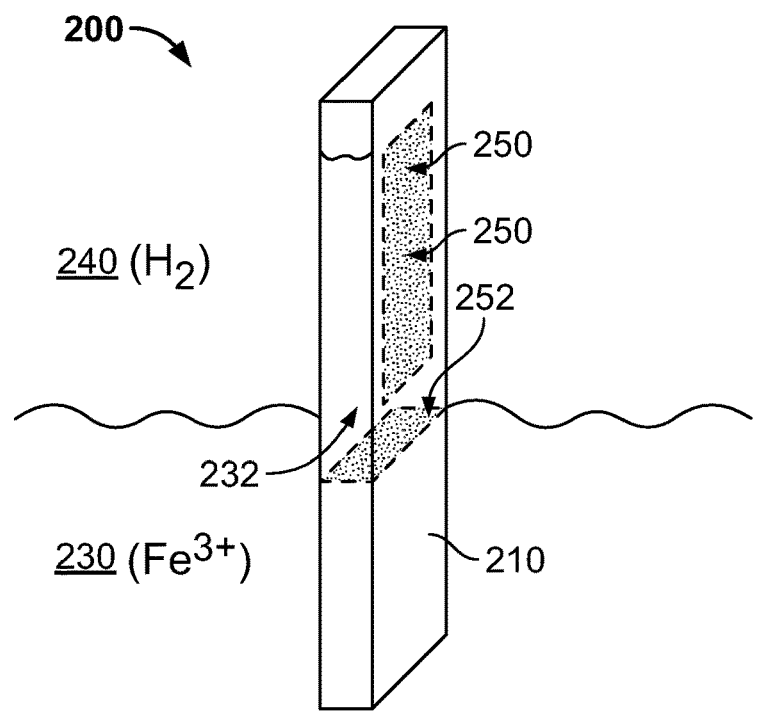
FIG. 13 is a perspective schematic of a capillary-action galvanic reactor according to certain disclosed embodiments.

An example of such a CGR is shown in FIG. 13. Carbon felt comprises the main body 210 of the CGR 200. The dimensions of the CGR 200 may be proportioned appropriately to the system, with the illustrated example having an exemplary thickness of 0.3 cm, width of 1.5 cm, and height of 4.0 cm. In turn, this affords an effective surface area for the capillary action of about 0.5 $cm^2$ and a catalytic surface area exposed to the hydrogen gas of about 3.0 $cm^2$.

The CGR 200 is positioned in fluid communication with liquid electrolyte 230 and hydrogen gas 240, both of which are contained within the positive electrolyte reservoir (not indicated in FIG. 13) in which CGR 200 is positioned.

Electrolyte 230 is drawn into the submerged portion of porous main body 210 as indicated by arrow 232. Interface 252 indicates the surface area over which electrolyte 230 may be wicked up. On the opposing end, catalyst layer 250 is exposed to the gases residing in the head space of the reservoir, including hydrogen gas 240.

The flow battery may comprise one or more reactors for the oxidation of the hydrogen produced from during operation of the battery. In one embodiment, the flow battery system comprises one reactor (e.g., one MEA or CGR). In another embodiment, the flow battery system comprises at least two reactors. In still other embodiments, the flow battery system comprises two, three, four, five, or even more reactors for oxidizing the hydrogen. The type and number of reactors (e.g., reactor 134) may be chosen as desired to process all of the hydrogen produced during operation of the battery at a desired rate to rebalance the electrolyte and efficiently operate the system.

In embodiments, the flow battery system may use an array of smaller MEAs. This complete reactor may be referred to as the MEA array recombination system (MARS), and a flow battery system that incorporates the MARS is illustrated in FIG. 3.

The reaction that occurs in the MARS produces protons, causing the pH in the positive electrolyte to decrease. As stated above, a necessary step is to get those protons back to the negative electrolyte. To that end, in one embodiment, the system may include a proton diffusion cell (PDC), which allows the protons to diffuse back into the negative electrolyte.

Figure 3:
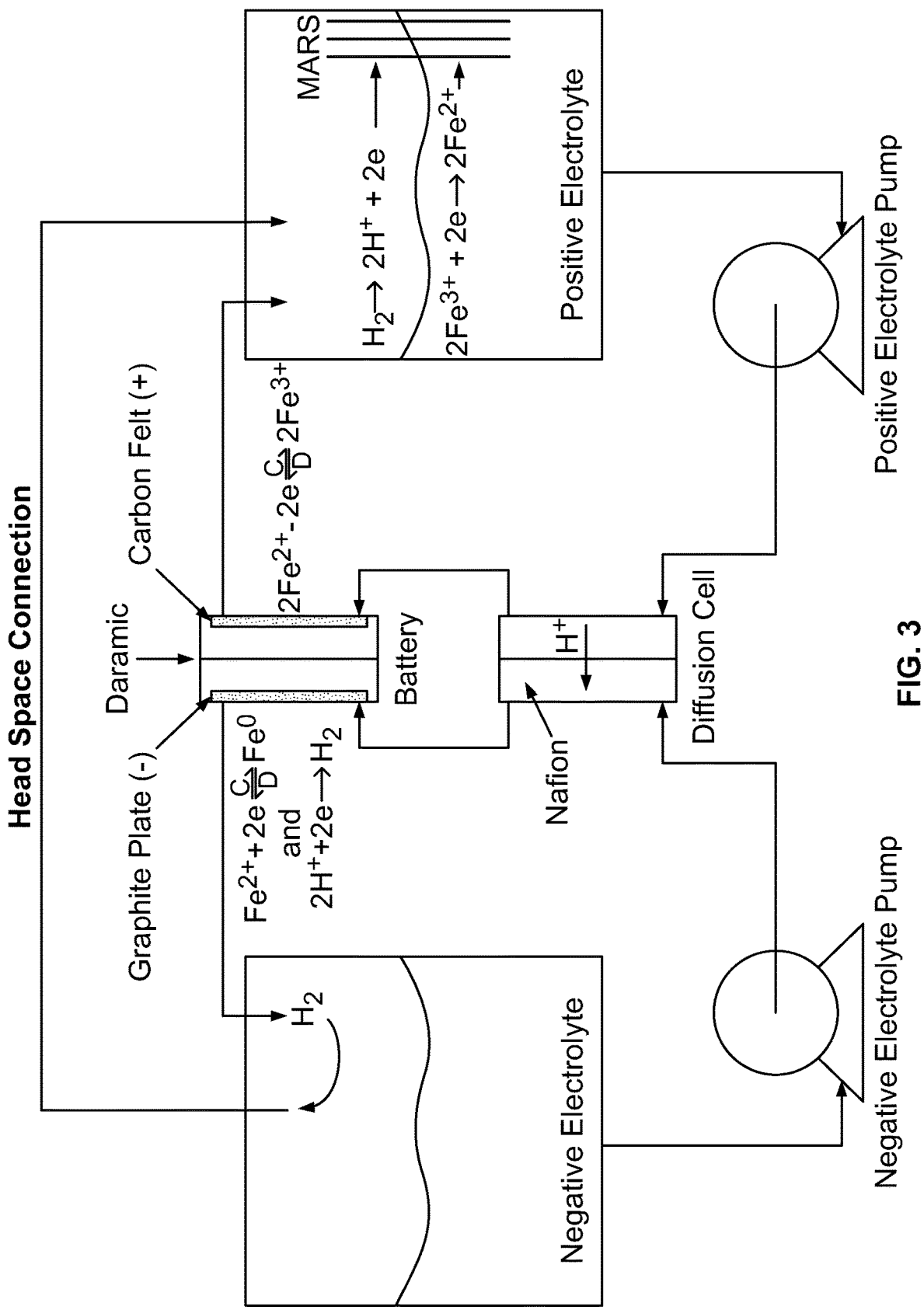
FIG. 3 is a schematic representation of a configuration of a flow battery system using an array of membrane electrode assemblies to carry out the electrolyte recombination and an in-line proton diffusion cell to carry out the complete hydrogen cycle. In the chemical reactions, "C" means charge direction and "D" means discharge direction.

In the embodiment depicted in FIG. 3, the system includes a proton diffusion cell (PDC) that helps balance pH between the two electrolyte reservoirs (e.g., holding tanks 112 and 114 of FIG. 1). The PDC comprises a proton exchange membrane that the electrolytes flow by. There are no electrochemical reactions that occur at the PDC, only diffusion of protons from the positive electrolyte to the negative electrolyte through the proton exchange membrane.

The reactor for rebalancing the electrolyte may be positioned in the positive electrolyte reservoir as desired and in any suitable manner to achieve the desired result of converting the hydrogen to protons to adjust the system. In embodiments, the reactors may be a free-floating device configured to be at least partially submerged in the electrolyte. In still other embodiments, the system may include an apparatus to hold the reactor(s) in a fixed position within the positive electrolyte reservoir.

In one embodiment an initial acid addition can be used to prevent precipitation for a finite amount of time in the negative electrode. Over-addition of acid will cause excessive hydrogen generation, so good design requires a balance between electrolyte stability and coulombic efficiency (i.e., the ratio of the output of charge by a battery to the input of charge). Assuming there will always be some hydrogen evolution, acid addition is clearly insufficient to ensure long-term electrolyte stability. To control pH and ferric ion concentration, therefore, a recombination strategy must also be implemented.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

EXAMPLES

Aspects of this disclosure will now be described and may be further understood with respect to the following examples. The examples are intended to be illustrative only and are to be understood as not limiting the invention disclosed herein in any way as to materials, or process parameters, equipment or conditions.

Electrolyte thermodynamics were simulated to predict pH and ferrihydrite precipitation limits at different states of charge. A capillary-action galvanic reactor was characterized using potential, polarization and impedance measurements at hydrogen partial pressures ranging from 0-15 $psi_g$. Using the pressure response after pulse-injecting hydrogen into a sealed vessel, a pseudo steady-state recombination rate of 50 mA was measured for a capillary-action galvanic reactor with 6 $cm^2$ active area in 0.5 M $FeCl_3$. The reaction current was limited by hydrogen diffusion at partial pressures from 0 to 2 $psi_g$, beyond which there is a mixed regime and a $Fe^{3+}$ diffusion-limited regime. A complex hydrogen electrode potential response reveals information about $Fe^{3+}$ and $H_2$ transport. The reactor was interpreted in terms of potential measurements and the Evans diagram. Pressure control through recombination is demonstrated in a sealed all-iron flow battery system.

Thermodynamics Simulation

Electrolyte thermodynamics were simulated using PHREEQC (D. L. Parkhurst, C. A. J. Appelo, User's Guide To PHREEQC (version 2) a Computer Program for Speciation, and Inverse Geochemical Calculations, Exchange Organizational Behavior Teaching Journal D (Version 2) (1999) 326), which uses the Newton-Raphson method to solve the coupled system of equations describing mass-action laws, mass balances and electroneutrality in aqueous electrolytes. For activity coefficients, it implemented specific ion interaction theory (SIT) (See e.g., I. Grenthe, A. Plyasunov, On the use of Semiempirical Electrolyte Theories for Modeling of Solution Chemical Data, Pure and Applied Chemistry 69 (5) (1997); I. Grenthe, H. Wanner, Guidelines for the Extrapolation To Zero Ionic Strength, OECD Nuclear Energy Agency), which is appropriate for modeling concentrated electrolytes. The chemical reactions in the electrolyte were based on hydrolysis and formation of metal ion complexes with chloride and hydroxide. In terms of solid phase formation, this study only considered ferrihydrite, ignoring any possible formation of crystalline materials such as goethite or hematite, which form over relatively long time periods. All other simulation parameters, including constants for complexation, hydrolysis, and dissolution, were from the ThermoChimie database (E. Giffaut, M, et al. Thermodynamic Database for Performance Assessment: ThermoChimie, Applied Geochemistry 49 (2014) 225-236) included with PHREEQC. It was assumed that a small amount (taken here to be 10 mM) of $Fe^{3+}$ was always present in both positive and negative electrolytes at 0% state-of-charge (SOC). This is because some $Fe^{2+}$ is oxidized by air during electrolyte preparation. Also, during battery operation, there is some crossover of ferric ions from the positive to the negative reservoir. Electrolyte solutions were assumed to contain 2 M NaCl as a supporting electrolyte, and the SOC was defined using the nominal solution compositions, e.g., 50% SOC in the negative electrolyte implied a solution containing 0.5 M FeCl$_2$ and 2 M NaCl.

EXPERIMENTAL

Figure 5:
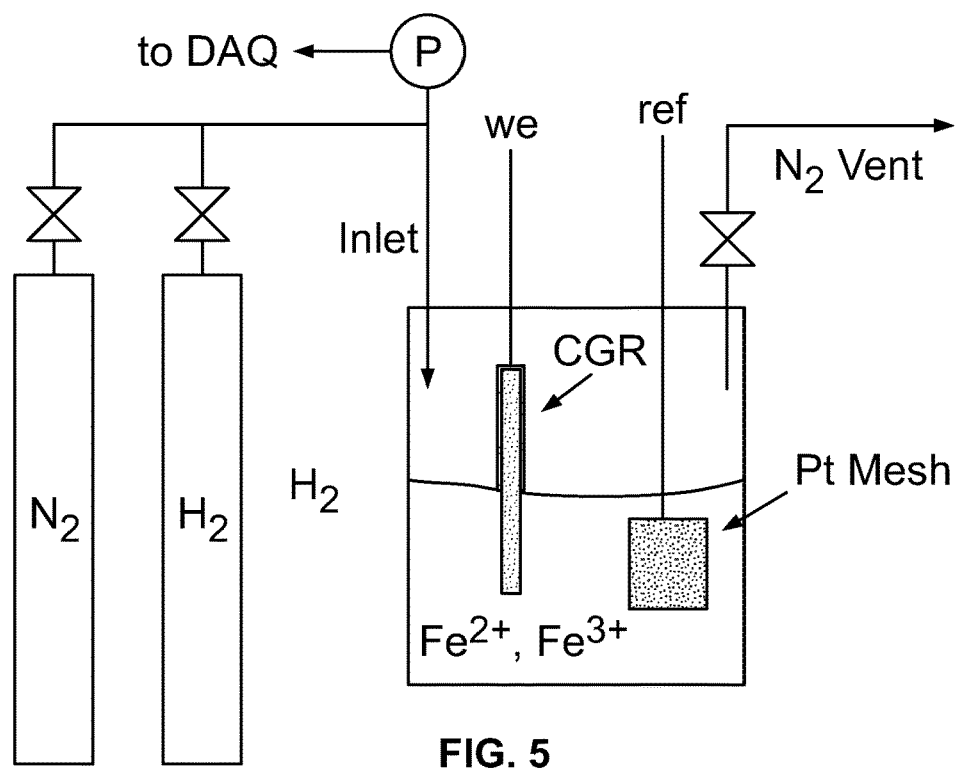
FIG. 5 is a schematic representation of the two-electrode setup used to obtain $H_2$—$Fe^{3+}$ recombination rate and potential measurements.

The CGR was fabricated using a carbon felt substrate (SGL TECHNIC, Inc. GFD 3, thickness=3 mm) that was heated in air at 400° C. for 24 h. The upper half of the CGR contained a layer of Pt/C (E-Tek, Inc., 20%$_w$ Pt on Vulcan XC-72), which was painted onto the felt as an ink using PVDF as a binder. The H$_2$—Fe$^{3+}$ recombination reaction on the CGR was then investigated in different ways using sealed vessels (V=200 mL). A schematic of the two-electrode setup used to measure the H$_2$—Fe$^{3+}$ recombination rate and hydrogen electrode potential is shown in FIG. 5. The CGR was partially submerged in the electrolyte such that the lower half (the iron electrode) was in solution to carry out Fe$^{3+}$ reduction and the upper half (the hydrogen electrode) was in the reactor headspace to facilitate hydrogen oxidation. A polyethylene frame was used to hold the CGR in place. After purging the headspace with nitrogen, hydrogen was pulse-injected into the reservoir at several partial pressures ranging from PH2=0 to 1 atm, and the pressure was recorded using a 0-5 V digital transducer.

After injecting hydrogen, the pressure began to drop due to the hydrogen being consumed by oxidation on the CGR. The recombination reaction rate, IH$_2$ (A) was found from the slope of the pressure drop using the equation:

$$IH_2 = \frac{-nFV_{hs}(dP=dt)}{RT}$$

where n is the number of electrons involved in the reaction, F is the Faraday constant (96,485 C/mol e), V$_{hs}$ is the headspace volume (L), R is the universal gas constant (0.08206 L atm mol$^{-1}$K$^{-1}$), T is the temperature (300 K). A three-electrode setup (see FIG. 6) was used to measure hydrogen polarization and impedance spectra.

In FIG. 6, the counter electrode was a platinum mesh (Pt) and the reference electrode (ref) was Ag/AgCl (3.0 M NaCl). The potential was raised from –0.2 to 0.9 V vs Ag/AgCl in increments of 50 mV, holding constant potential for 15 seconds at each value to reach an approximate steady state. In order to avoid any complications that could result from having iron ions in the solution, these studies used only 2 M NaCl and HCl adjusted to pH 1.4, the pH of the positive electrolyte at 50% SOC. As hydrogen was oxidized in the gas-phase portion of the CGR, the platinum mesh counter electrode carried out proton reduction; hence, the hydrogen balance was maintained in each phase. A conventional H-cell was used to measure polarization curves to construct an Evans diagram. Ferrous oxidation and hydrogen reduction were measured using an iron electrode and ferric reduction was measured on a graphite electrode. Hydrogen oxidation was measured on the CGR (A$_{hs}$=6 cm2) using the setup shown in FIG. 6.

Figure 4:
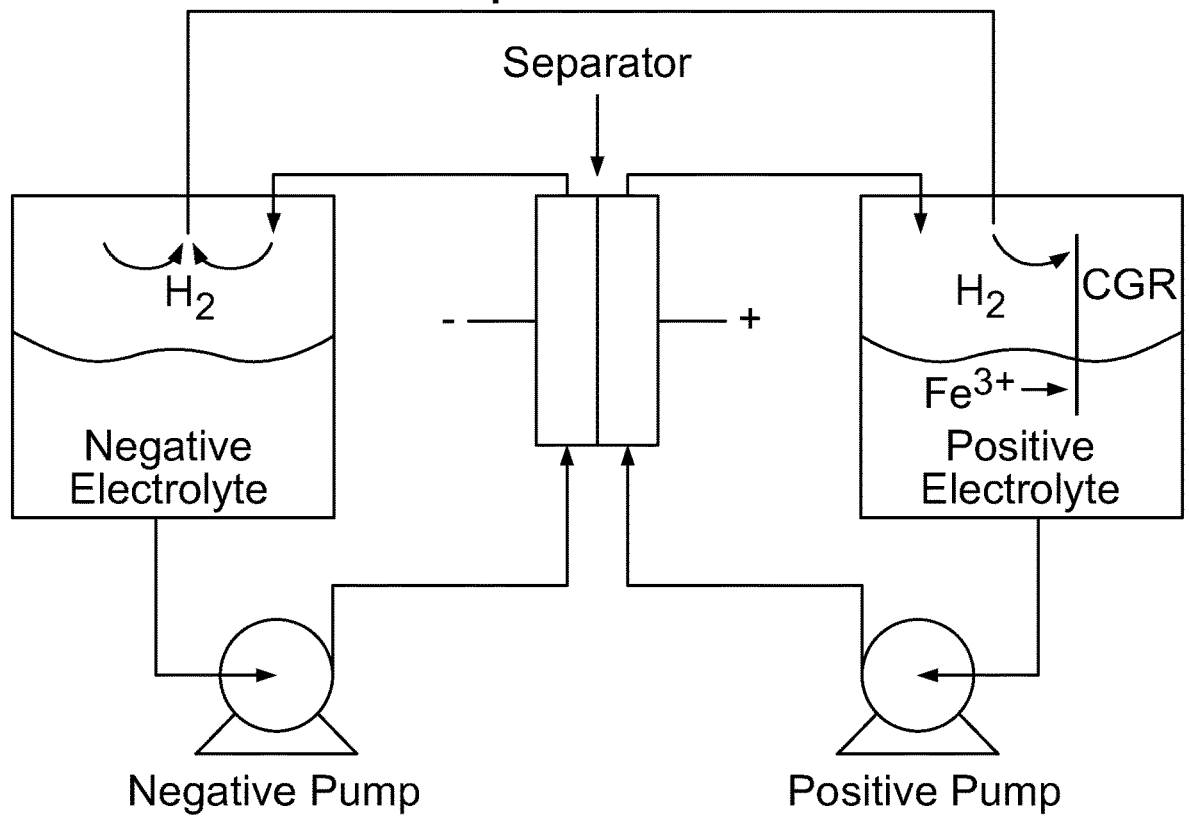
FIG. 4 is a schematic representation of a configuration of a flow battery system including the use of the capillary-action galvanic reactor. A headspace connection tube provides a pathway for $H_2$ to diffuse from the negative to the positive reservoir.

A sealed all-iron flow battery system (see FIG. 4) was cycled both with and without the CGR for comparison of the pressure profiles. In each cycling test, the battery was charged and discharged at +/−20 mA/cm2, where each charge duration was one hour. The battery electrodes consisted of flat graphite plates (A$_{geo}$=6.25 cm2) and the separator was porous polyethylene (Daramic®). The system operated at ambient temperature, and both electrolytes were pumped at 50 mL/min using a peristaltic pump. Both electrolytes contained 1 M FeCl$_2$ and 2 M NaCl, and the positive electrolyte also contained 0.5 M FeCl$_3$. Each reservoir contained 100 mL of electrolyte, and the headspace volumes were connected using ¼" tubing in order to create a pathway for hydrogen diffusion from the negative to the positive reservoir.

Results

An important chemical reaction related to electrolyte stability is ferric ion hydrolysis. This generic ferric hydrolysis reaction given by the below equation leads to electrolyte acidification and the formation of various iron hydroxide species Such reactions have been studied in detail in dilute solutions.

$$Fe^{3+} + nH_2O \leftrightharpoons Fe(OH)^{3-n} + nH^+$$

The equilibrium constant for ferrous hydrolysis is on the order of Keq=1·2·10$^{-8}$ (K. H. Gayer, L. Wootner, The Hydrolysis of Ferrous Chloride at 251, Journal of the American Chemical Society 78 (16) (1956) 3944-3946), whereas that for ferric is on the order of Keq=1·10$^{-3}$ (C. M. Flynn Jr., Hydrolysis of Inorganic Iron (III) Salts, Chem. Rev. 84 (1) (1984) 31-41.) Hence, ferric chloride is a considerably stronger acid than ferrous chloride, and its hydrolysis is the primary controller of pH, excluding effects from added acids or H$_2$ evolution.

Simulated electrolyte pH values are shown in FIGS. 7(a) and 7(b), where natural pH (indicated by line N) is compared to the pH in equilibrium with ferrihydrite (indicated by line EQ). This relationship (defined as the pH at which SI=log (IAP=Ksp)=0) is also a function of nominal SOC for both electrolytes, where SI is the saturation index, IAP is the ion activity product and Ksp is the solubility product defined as:

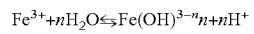

$$K_{sp} = (a_{Fe3+} \cdot a^3_{H2O})/a^3_{H+} = 10^{2.54}$$

These results predicted the negative electrolyte, assuming it contained 10 mM of ferric chloride, to be supersaturated with ferrihydrite (SI>0) throughout the entire SOC. The negative electrolyte is, hence, particularly susceptible to ferrihydrite precipitation. The positive electrolyte, however, is immune to precipitation at high SOC because of the low pH associated with high concentrations of ferric ions available for hydrolysis. In principal, then, it might seem desirable to maintain a high concentration of Fe$^{3+}$ in both electrolytes. Paradoxically, though, this would decrease the coulombic efficiency of the battery due to reduction of Fe$^{3+}$ rather than Fe$^{2+}$ during charging. For this same reason, good battery design minimizes Fe$^{3+}$ crossover from the positive to the negative reservoir.

While it is possible to lower the electrolyte pH in order to prevent ferrihydrite precipitation for some finite amount of time, long-term stability requires recombination, otherwise the pH will eventually rise and the electrolyte will also become over-concentrated in Fe$^{3+}$. For practical application, the recombination strategy should emphasize simplicity. For these reasons, the CGR design was developed and characterized using several techniques in pressurized electrochemical cells. The electrolyte communication was made through capillary action within the carbon felt network. Hydrogen was oxidized on the upper half of the CGR at the available triple-point sites. Protons and electrons, liberated by hydrogen oxidation, transported downward (in the "in-plane" direction) into the positive electrolyte, where aqueous ferric ions (Fe$^{3+}$) were reduced to ferrous ions (Fe$^{2+}$). The carbon felt served as the electron carrier.

Figure 8A:
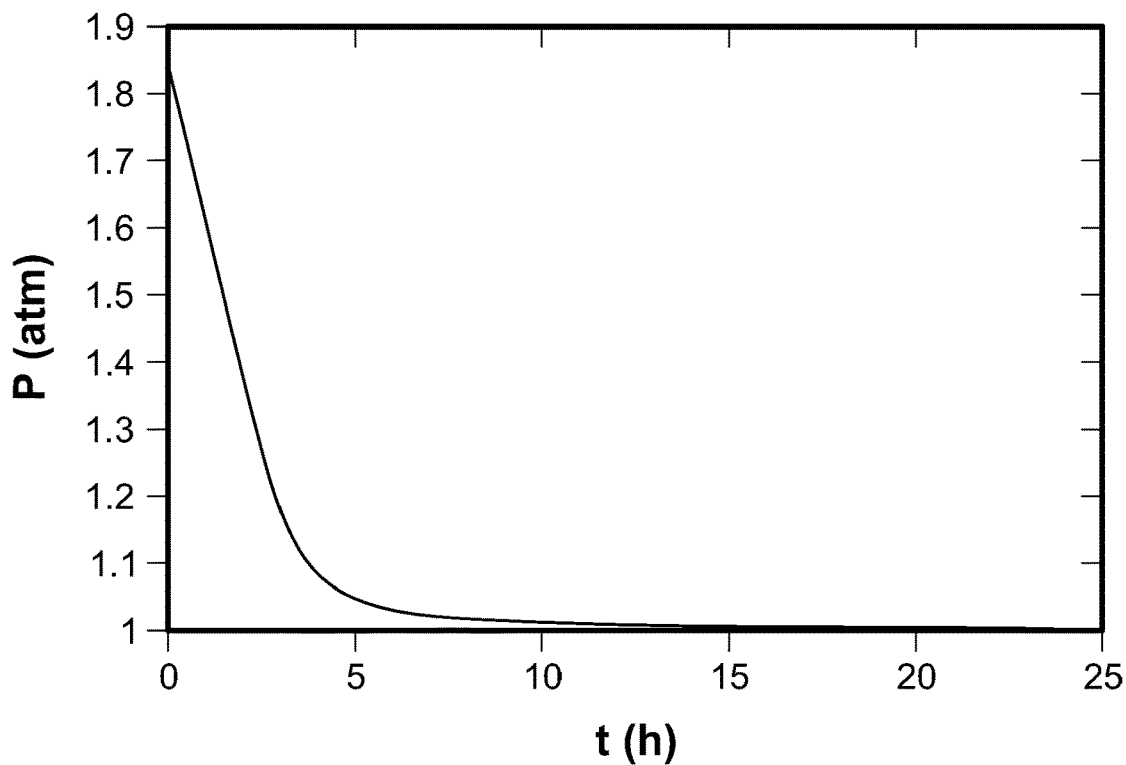
FIGS. 8A-8B is a graphic representation of 8A pressure and 8B rate behavior of the $H_2$—$Fe^{3+}$ recombination reaction in a sealed vessel. Hydrogen pressure was controlling at low pressures, but at higher values of $P_{H2}$, the rate became controlled by $Fe^{3+}$ and ohmic losses.
Figure 8B:
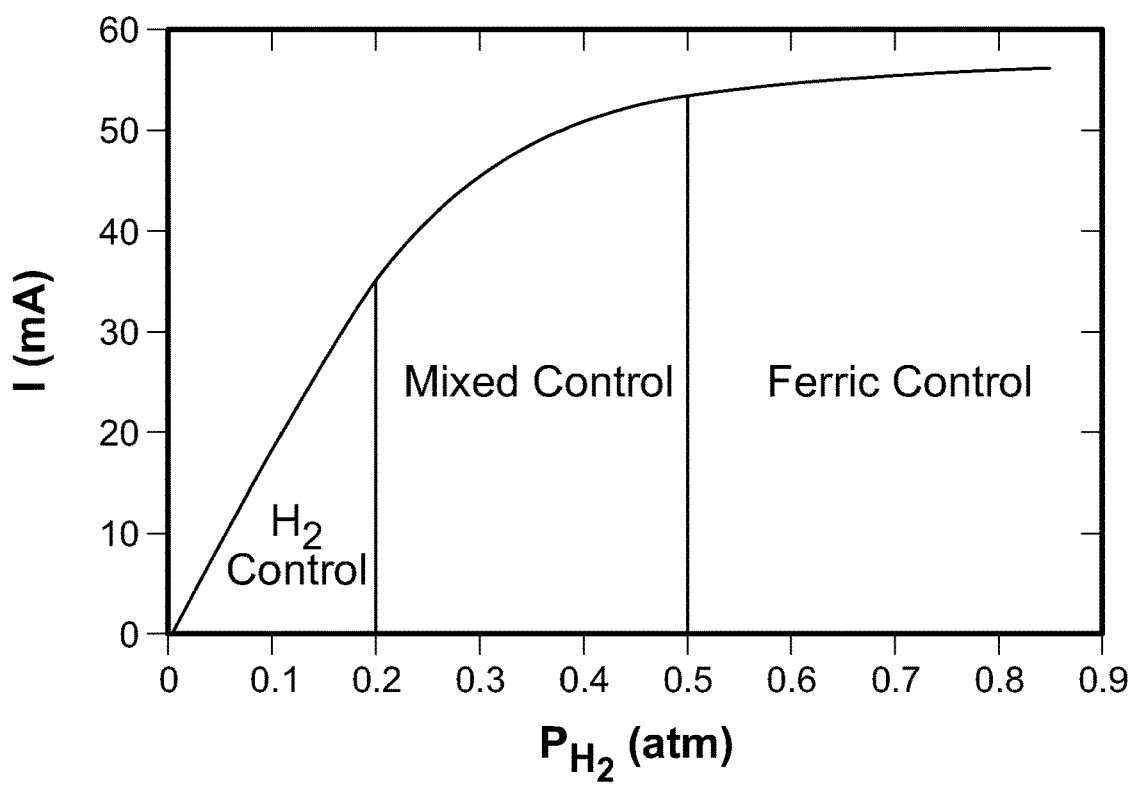

Representative behavior is shown in FIG. 8, where the recombination reaction was carried out in a solution containing 0.5M $FeCl_3$. Up to a hydrogen pressure of $P_{H2}\approx 0.2$ atm, the reaction rate was linearly proportional to the partial pressure. At higher partial pressures of hydrogen, however, the rate entered a mixed-control and then a limiting-current regime controlled by $Fe^{3+}$ diffusion and ohmic losses. This analysis was slightly affected by the changing concentration of $Fe^{3+}$ during the reaction process (about 8% drop in molarity for an experiment using one atmosphere of $H_2$).

Figure 9:
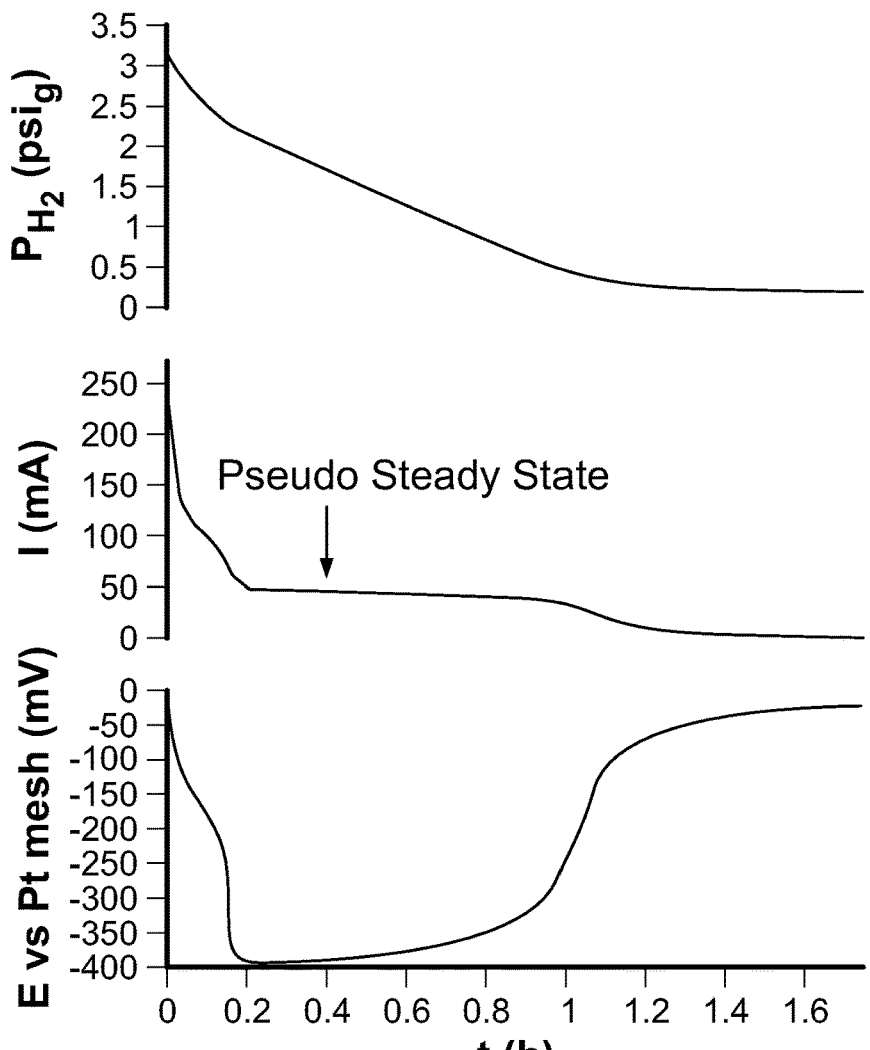
FIG. 9 is a graphic representation of pressure, reaction rate, and potential of a capillary-action galvanic reactor (area of the catalyzed area in the headspace, AHS=6 cm$^2$) as a function of time after pulse-injecting 3 psi$_g$ of hydrogen using the setup illustrated in FIG. 5.

Transient measurements of the mixed electrode potential and the hydrogen partial pressure, as measured using the setup shown in FIG. 5, are shown in FIG. 9. For these studies, nitrogen was used both for purging air and for testing the pressure seal. It was assumed that any measured pressure drop (after hydrogen addition) was due to hydrogen consumption, i.e., that there were no significant leaks. Initially, there was a relatively fast reaction rate because of the high concentration of ferric ions inside the felt network. After the ferric ions within the felt were consumed, a steady-state reaction rate was observed and the potential dropped to a value 400 mV more negative than the platinum mesh. During this period of time, ferric ion consumption was diffusing from the solution to the felt surface. The overall reaction rate was limited by a combination of ohmic and concentration polarization. Eventually, the hydrogen was consumed and so the electrode returned to its initial potential of 0 mV versus the platinum mesh.

Figure 10:
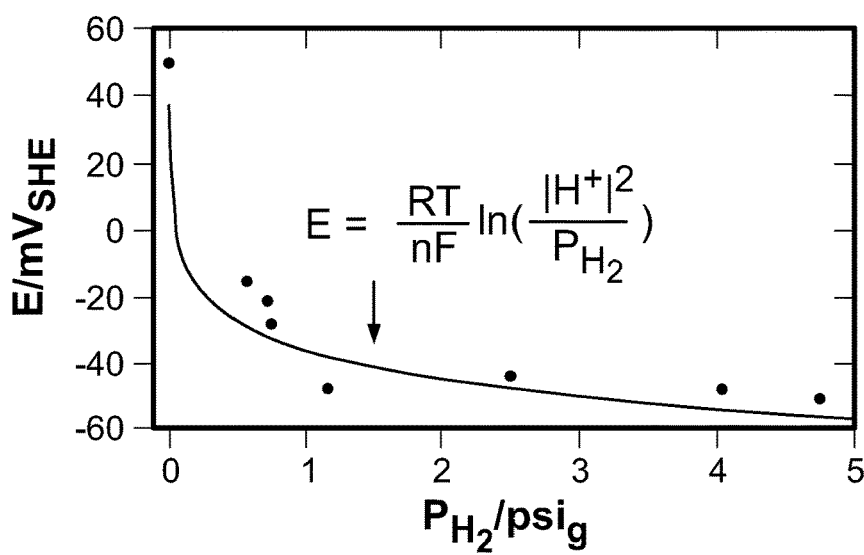
FIG. 10 is a graph depicting CGR potential as a function of hydrogen partial pressure ($P_{H2}$) as measured using the setup shown in FIG. 6.

Open-circuit potential measurements taken in NaCl solutions and graphically represented in FIG. 10. These measurements confirmed that the upper half of the CGR behaved like a hydrogen electrode in terms of its Nernstian potential. This confirmed the ability of the porous material to wick electrolyte vertically through capillary action, establishing a complete electrochemical cell.

Figure 11A:
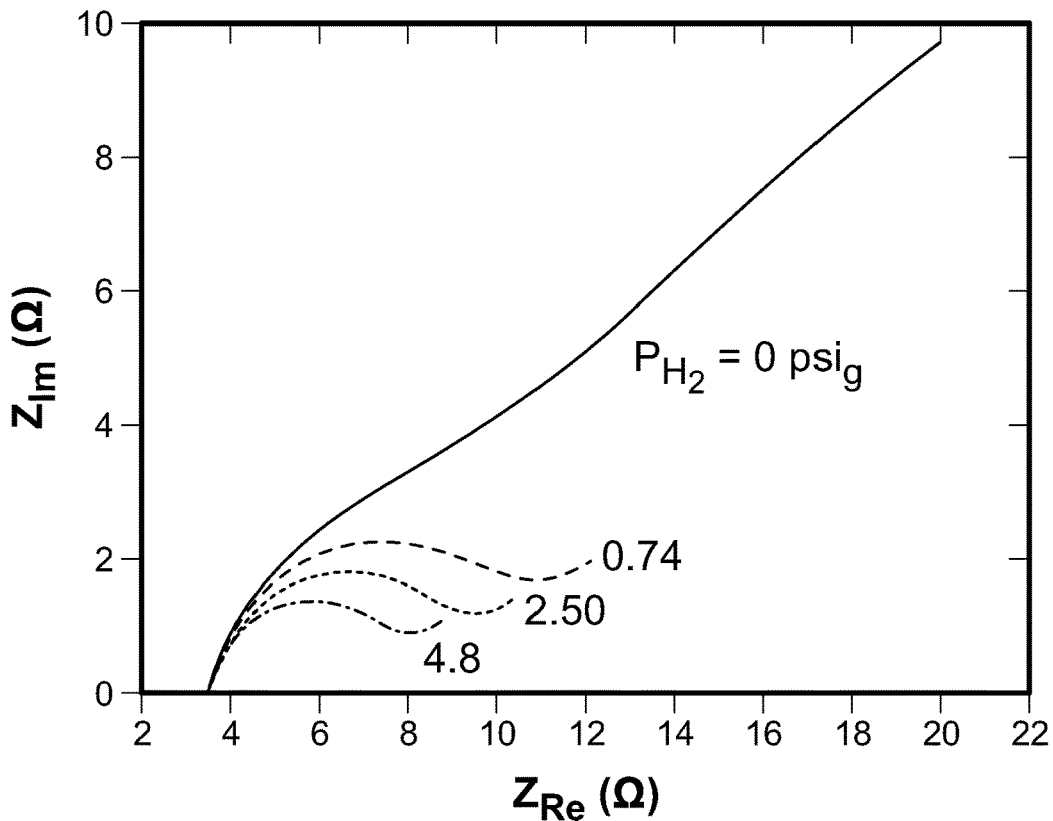
FIGS. 11A-11B is a graph depicting 11A impedance spectra and 11B polarization of a capillary-action galvanic reactor with A=6 cm² in each phase, shown for several partial pressures of hydrogen as measured using the setup illustrated in FIG. 6.
Figure 11B:
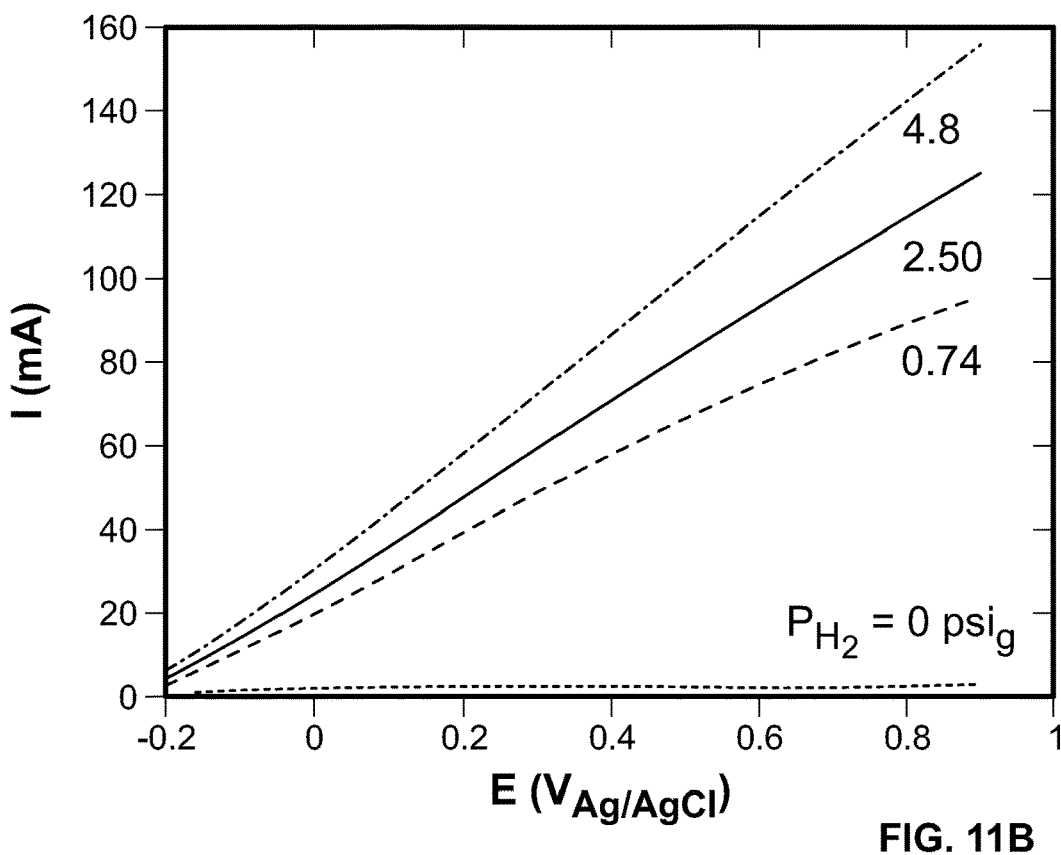

The impedance spectra and polarization behavior, as measured using the apparatus shown in FIG. 6, are shown in FIG. 11 for several partial pressures of hydrogen. The baseline experiment, which contained only nitrogen in the headspace, showed neither a charge-transfer loop nor any significant current flow, confirming the absence of major side reactions. When hydrogen was present in the headspace, however, charge transfer loops and currents up to 160 mA were observed. Even a low hydrogen partial pressure of 0.74 $psi_g$ was able to sustain 90 mA of total current ($A_{HS}$=6 $cm^2$), suggesting that it is not necessary to build up high pressures of hydrogen for an effective recombination system.

Figure 12:
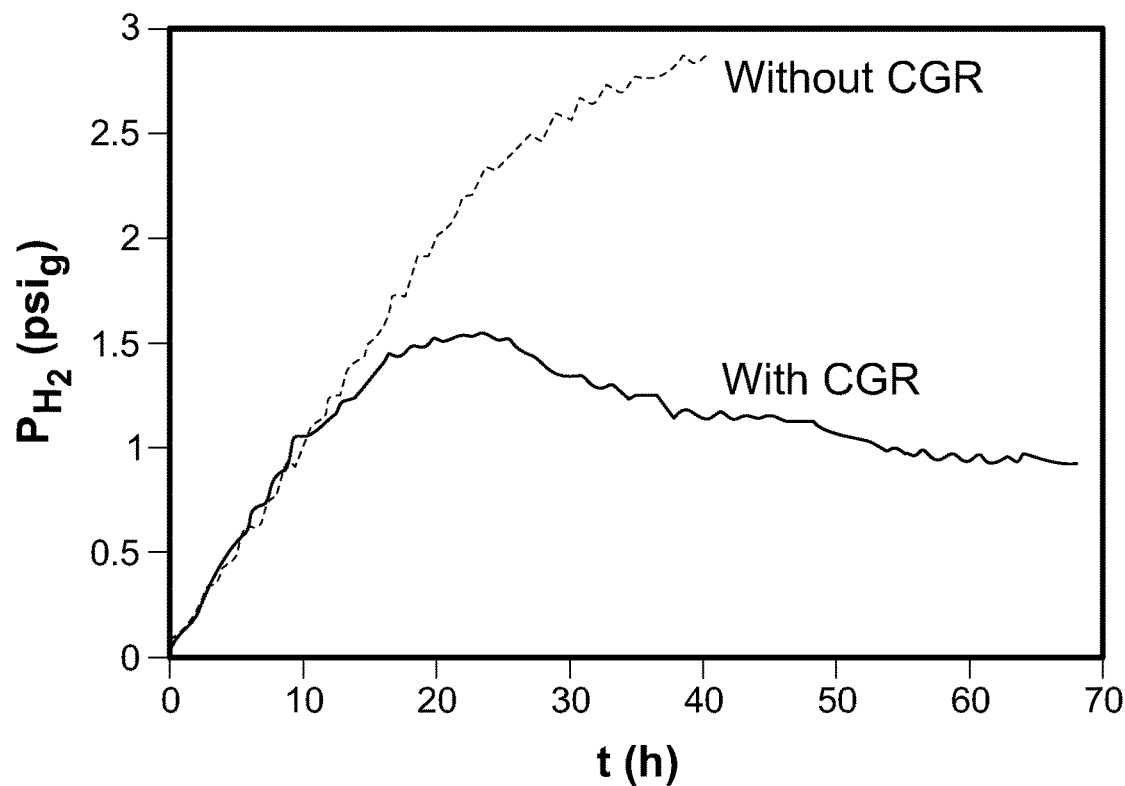
FIG. 12 is a graph depicting the comparison of pressure profiles during battery cycling at +/−20 mA/cm² using the setup illustrated in FIG. 4.

A sealed recombinant all-iron hybrid flow battery system was cycled both with and without a CGR for comparison of the system pressure profiles, as shown in FIG. 12. Initially, pressure increased at the same rate in each configuration, but the pressure profiles diverged after about 18 hours into the cycling. While the battery without the CGR continued to increase in pressure, the battery with the CGR used the recombination reaction for pressure control. An equilibrium partial pressure of $P_{H2}$=1 $psi_g$ was observed, and this was consistent with polarization and batch reactor experiments in terms of the associated hydrogen current, assuming approximately 10% of the battery charging current went to hydrogen evolution. These results showed that it is possible to contain the hydrogen and control the headspace pressure of a sealed recombinant flow battery system.

Figure 14:
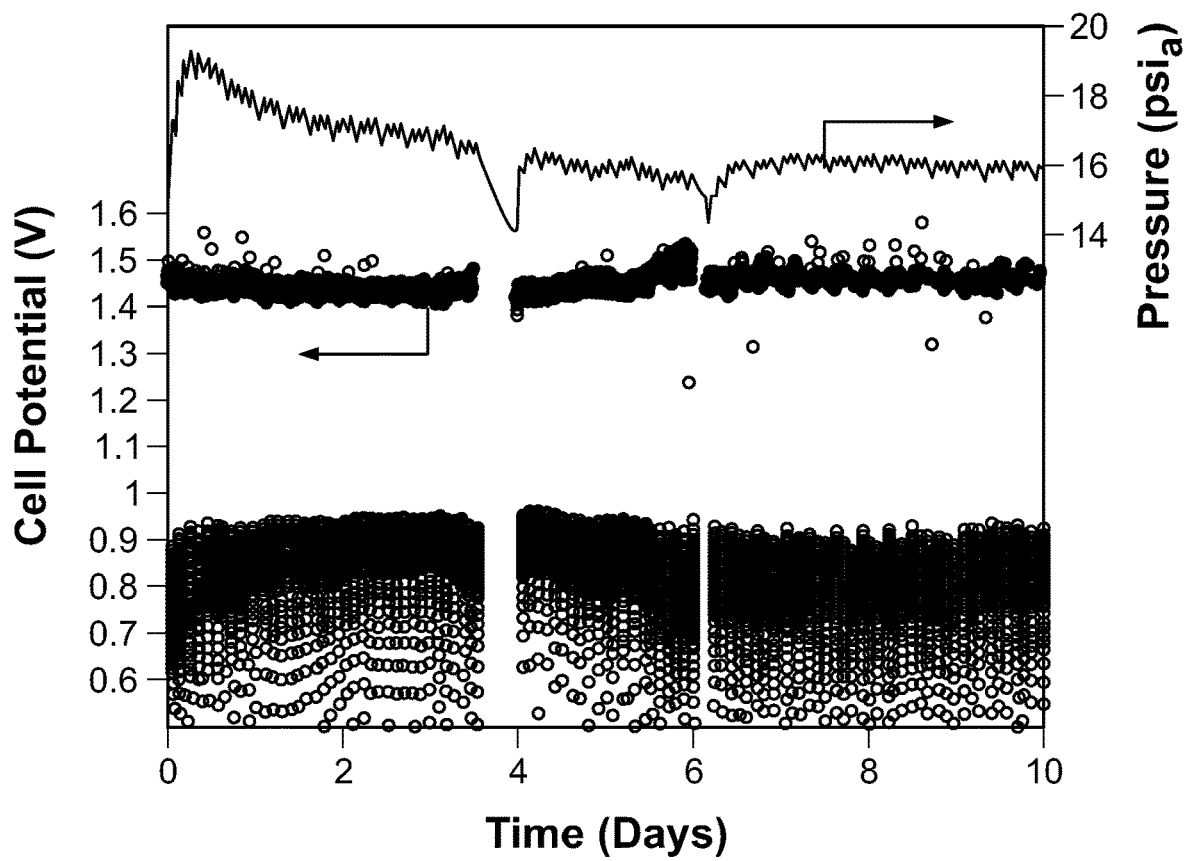
FIG. 14 are graphical representations of performance data for a 30 cm² battery system on a continuous charge-discharge cycle at 100 mA/cm² and one hour cycling times.
Figure 14:
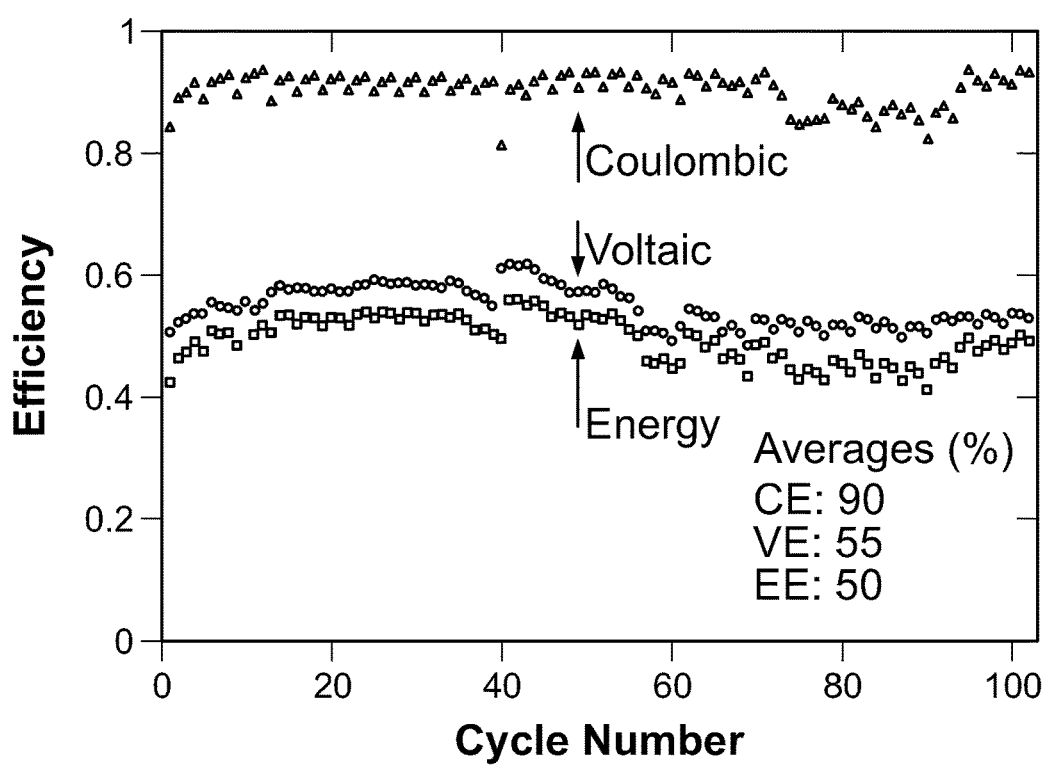

FIG. 14 indicates further performance data for a battery system using the electrolyte rebalancing disclosed herein in a 30 $cm^2$ battery during continuous charge-discharge cycling at room temperature with current densities of 100 $mA/cm^2$ and one hour charge times.

Embodiments of the technology have been described above with reference to various embodiments and examples, and modifications and alterations may occur to others upon the reading and understanding of this specification. The claims as follows are intended to include all modifications and alterations insofar as they come within the scope of the claims or the equivalent thereof.

This written description uses examples to disclose the invention, including the best mode, and also to enable any person skilled in the art to make and use the invention. The patentable scope of the invention is defined by the claims-, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

All citations referred herein are expressly incorporated herein by reference.

What is claimed is:

1. A sealed flow battery system connected to an electrical load, the system comprising:
    a negative electrolyte reservoir supplying negative electrolyte to a first half cell of a flow battery reaction cell by way of a negative flow path connection;
    a positive electrolyte reservoir supplying positive electrolyte to a second half cell of the flow battery reaction cell by way of a positive flow path connection;
    a self-contained, rebalancing reactor: i) positioned completely within the positive electrolyte reservoir, ii) configured to be wetted by the positive electrolyte, and iii) adapted to receive hydrogen gas generated by the flow battery reaction cell while supplying protons thereto, said rebalancing reactor having a first electrode material configured to convert hydrogen to protons and a second electrode material configured to reduce metal ions in the positive electrolyte;
    wherein the flow battery reaction cell comprises the first half cell and the second half cell and includes a separator disposed between positive electrode that is in communication with the positive flow path connection and negative electrode that is in communication with the negative flow path connection;
    wherein: i) the flow battery reaction cell, the negative electrolyte reservoir, the negative electrolyte flow path connection, the positive electrolyte reservoir, and the positive flow path connection all form a closed loop in which negative electrolyte circulates between the negative electrolyte reservoir and the first half cell and positive electrolyte circulates between the positive electrolyte reservoir and the second half cell; ii) the positive flow path connection and the negative flow path connection each represent discrete flow paths within the closed loop; and iii) the closed loop prevents introduction of any additional fluids thereto during operation of the sealed flow battery system; and
    wherein the rebalancing reactor is a membrane-electrode assembly includes a wicking material selected from an ionomer membrane or a porous and electrically conductive carbon felt.

2. The system of claim 1 wherein the membrane-electrode assembly is positioned perpendicular to a fluid line within the positive electrolyte reservoir so that a first end is submerged in the positive electrolyte and a second end is disposed in a head space portion of the positive electrolyte reservoir.

3. The system of claim 2 wherein catalyst is disposed at both ends of the membrane-electrode assembly.

4. The system of claim 1 wherein an array of membrane-electrode assemblies are provided.

5. A sealed flow battery system connected to an electrical load, the system comprising:
   a negative electrolyte reservoir supplying negative electrolyte to a first half cell of a flow battery reaction cell by way of a negative flow path connection;
   a positive electrolyte reservoir supplying positive electrolyte to a second half cell of the flow battery reaction cell by way of a positive flow path connection;
   a self-contained, rebalancing reactor: i) positioned completely within the positive electrolyte reservoir, ii) configured to be wetted by the positive electrolyte, and iii) adapted to receive hydrogen gas generated by the flow battery reaction cell while supplying protons thereto, said rebalancing reactor having a first electrode material configured to convert hydrogen to protons and a second electrode material configured to reduce metal ions in the positive electrolyte;
   wherein the flow battery reaction cell comprises the first half cell and the second half cell and includes a separator disposed between positive electrode that is in communication with the positive flow path connection and negative electrode that is in communication with the negative flow path connection;
   wherein: i) the flow battery reaction cell, the negative electrolyte reservoir, the negative electrolyte flow path connection, the positive electrolyte reservoir, and the positive flow path connection all form a closed loop in which negative electrolyte circulates between the negative electrolyte reservoir and the first half cell and positive electrolyte circulates between the positive electrolyte reservoir and the second half cell; ii) the positive flow path connection and the negative flow path connection each represent discrete flow paths within the closed loop; and iii) the closed loop prevents introduction of any additional fluids thereto during operation of the sealed flow battery system; and
   wherein the rebalancing reactor is a capillary-action galvanic reactor.

6. The system of claim 5 wherein the rebalancing reactor includes porous carbon felt.

7. The system of claim 5 wherein the sealed flow battery system comprises an iron-based flow battery and wherein, in the rebalancing reactor, the first electrode material is a hydrogen electrode and the second electrode material is an iron electrode.

8. The system of claim 6 wherein an array of capillary-action galvanic reactors are provided.

9. The system of claim 5 wherein the system is passive so that no pumps or pressurized gases are provided in connection with recombining the positive and/or the negative electrolyte(s).

10. The system of claim 5 wherein at least one catalyst selected from platinum, palladium, iridium, and ruthenium is contained within the rebalancing reactor.

11. The system of claim 5 wherein a proton diffusion cell is coupled to the flow battery reaction cell, said proton diffusion cell is positioned within the closed loop so as to receive the negative electrolyte from the negative electrolyte reservoir and, separately, the positive electrolyte from the positive electrolyte reservoir so that protons from the positive electrolyte diffuse back into the negative electrolyte before each of the negative and positive electrolytes circulate from the negative electrolyte reservoir and the positive electrolyte reservoir into the flow battery reaction cell.

12. The system of claim 5 further comprising a headspace connection between a headspace portion of the negative electrolyte reservoir and a headspace portion of the positive electrolyte reservoir and wherein: i) the flow battery reaction cell, the headspace connector, the negative electrolyte reservoir, the negative electrolyte flow path connection, the positive electrolyte reservoir, and the positive flow path connection all form a closed loop in which negative electrolyte circulates between the negative electrolyte reservoir and the first half cell and positive electrolyte circulates between the positive electrolyte reservoir and the second half, and ii) the headspace connection, the positive flow path connection, and the negative flow path connection each represent discrete flow paths within the closed loop.

13. The system of claim 1 wherein the system is passive so that no pumps or pressurized gases are provided in connection with recombining the negative and/or the positive electrolyte(s).

14. The system of claim 1 wherein at least one catalyst selected from platinum, palladium, iridium, and ruthenium is contained within the rebalancing reactor.

15. The system of claim 1 wherein a proton diffusion cell is coupled to the flow battery reaction cell, said proton diffusion cell is positioned within the closed loop so as to receive the negative electrolyte from the negative electrolyte reservoir and, separately, the positive electrolyte from the positive electrolyte reservoir so that protons from the positive electrolyte diffuse back into the negative electrolyte before each of the negative and positive electrolytes circulate from the negative electrolyte reservoir and the positive electrolyte reservoir into the flow battery reaction cell.

16. The system of claim 1 further comprising a headspace connection between a headspace portion of the negative electrolyte reservoir and a headspace portion of the positive electrolyte reservoir and wherein: i) the flow battery reaction cell, the headspace connector, the negative electrolyte reservoir, the negative electrolyte flow path connection, the positive electrolyte reservoir, and the positive flow path connection all form a closed loop in which negative electrolyte circulates between the negative electrolyte reservoir and the first half cell and positive electrolyte circulates between the positive electrolyte reservoir and the second half, and ii) the headspace connection, the positive flow path connection, and the negative flow path connection each represent discrete flow paths within the closed loop.

* * * * *